United States Patent [19]

Thornley

[11] 4,316,940

[45] Feb. 23, 1982

[54] HIGH-SOLIDS POLYESTER AND AMINOPLAST COATING COMPOSITION

[75] Inventor: Glenn D. Thornley, Wilmington, Del.

[73] Assignee: E. I. Du Pont de Nemours and Company, Wilmington, Del.

[21] Appl. No.: 175,849

[22] Filed: Aug. 7, 1980

Related U.S. Application Data

[63] Continuation-in-part of Ser. No. 132,501, Mar. 21, 1980, abandoned.

[51] Int. Cl.$^3$ .................. B32B 27/36; B32B 27/38; C08L 63/00
[52] U.S. Cl. ............................ 428/413; 260/21; 428/414; 428/480; 525/438
[58] Field of Search .................. 525/438; 260/21; 428/413, 414, 480

[56] References Cited

U.S. PATENT DOCUMENTS

| | | | |
|---|---|---|---|
| 3,098,835 | 7/1963 | Gaylord | 260/33.6 |
| 3,960,979 | 6/1976 | Khanna | 260/834 |
| 3,988,288 | 10/1976 | Yamauchi et al. | 260/37 |
| 3,992,346 | 11/1976 | Hartmann | 525/438 |
| 3,994,851 | 11/1976 | Chang | 260/29.4 |
| 4,046,937 | 9/1977 | McCaskey et al. | 428/211 |
| 4,073,827 | 2/1978 | Okasaka et al. | 260/835 |
| 4,229,555 | 10/1980 | Tobias | 525/443 |
| 4,243,705 | 1/1981 | Yapp | 525/438 |

*Primary Examiner*—Paul Lieberman

[57] ABSTRACT

A curable, high-solids coating composition has film-forming constituents of a low molecular weight hydroxyl-functional polyester based on branched-chain glycols, an epoxy-resin/acid ester, and an aminoplast resin. The composition can be applied at commercially acceptable temperatures and environmentally acceptable solvent levels to form a durable film.

13 Claims, No Drawings

HIGH-SOLIDS POLYESTER AND AMINOPLAST COATING COMPOSITION

CROSS REFERENCE TO RELATED APPLICATIONS

This application is a C-I-P of application Ser. No. 132,501, filed Mar. 21, 1980 now abandoned.

BACKGROUND OF THE INVENTION

1. Field of the Invention

This invention relates to a high-solids film-forming composition of a low molecular weight polyester with controlled hydroxyl functionality and an epoxy resin or ester of the resin and a monocarboxylic acid where the polyester and epoxy are crosslinked, during cure, with an aminoplast resin.

2. Description of the Prior Art

Conventional polyester-based coating compositions are well known in the finishes art, often comprising one or more hydroxyl-functional components which co-react with a suitable curing agent to form a polymeric paint film. For example, U.S. Pat. No. 3,994,851 issued Nov. 30, 1976 to Chang shows a specific polyester polyol which is cured with an amine-aldehyde condensation product.

A study of the related finishes art would make it evident, however, that in the field of polyester coatings, it is often necessary to sacrifice one desirable property to enhance another. For example, it is often difficult to obtain a coating composition that not only is applicable at high solids levels but also is tough, flexible, and durable. Also, coating compositions that are curable at lower temperatures often are insufficiently hard for industrial uses.

Therefore, with the current emphasis on reduction of solvent emissions, there is a continued need for coatings that not only can be applied at low solvent levels but also can be cured at commercially acceptable temperatures to produce a durable, flexible but hard, weather and stain resistant film.

SUMMARY OF THE INVENTION

There is provided by the present invention, a coating composition of a film-forming blend and a solvent for the blend wherein the blend is at least 50% by weight of the combined weight of the blend and the solvent and consists essentially of (a) 30–70% by weight, based on the weight of the blend, of a polyester polyol that is the reaction product of
  (1) pentaerythritol and at least one branched-chain glycol wherein the molar ratio of glycol to pentaerythritol is from 2:1 to 6:1,
  (2) an aromatic or aliphatic monocarboxylic acid, or mixtures thereof, having no more than 18 carbon atoms, and
  (3) a mixture of an aromatic and an aliphatic dicarboxylic acid wherein the molar ratio of aromatic acid to aliphatic acid is from 2:1 to 6:1,
  wherein the polyol has a hydroxyl content of 5–9% by weight;
(b) 4–35% by weight, based on the weight of the blend, of an epichlorohydrin-bisphenol-A epoxy resin, the esterification product of said resin with a monocarboxylic acid, or mixtures of these; and
(c) 25–35% by weight, based on the weight of the blend, of an aminoplast resin.

DETAILED DESCRIPTION OF THE INVENTION

The polyester coating composition of the present invention, quite useful as a finish for appliances, general industrial use, or automobiles, is composed primarily of a film-forming blend and a solvent for the blend. It can, however, also contain pigments, a reaction catalyst to decrease the curing time, and any of the various additives that are advantageously used in coating compositions for industrial or automotive finishes. The film-forming blend consists essentially of a polyester polyol, an epoxy resin or epoxy-resin/acid ester, and an aminoplast curing or crosslinking agent. The film-forming blend constituents at least 50%, preferably 60–90%, of the combined weight of the blend and the solvent.

The polyester polyol used in the present invention constitutes 30–70% by weight, preferably 50–70% by weight, and most preferably 60–65% by weight of the film-forming blend. This polyol is the condensation-reaction product of pentaerythritol, a glycol, a monocarboxylic acid, and a aromatic and an aliphatic dicarboxylic acid.

The first set of reactants necessary to form the polyester polyol useful in the invention is pentaerythritol and at least one glycol of the branched-chain variety. It has been found that the incorporation of such a glycol and pentaerythritol into the polyester imparts the desired hardness to the final cured film. Any branched-chain glycols are usable in the formation of this polyester, although it is preferred that these glycols contain no more than 8 carbon atoms. Neopentyl glycol and pinacol are examples of preferred branched-chain glycols. A particularly useful polyol is formed when the molar ratio of glycol to pentaerythritol is from 2:1 to about 6:1. A ratio of 3:1 to 4.5:1 is preferred.

The monocarboxylic acid component of the polyester polyol is present primarily to prevent molecular weight build-up of the polyol. To this end, it has been found that any aromatic or aliphatic monocarboxylic acid, or mixtures of these, having 18 or less carbon atoms can be used. Normally, this acid will be used in a molar ratio of acid to pentaerythritol of about 1:1 to 2.5:1.

Examples of preferred aromatic monocarboxylic acids are benzoic acid, paratertiary butylbenzoic acid, triethyl benzoic acid, toluic acid, phenylacetic acid, and the like. Examples of preferred aliphatic acids are acetic acid, propionic acid, butyric acid, valeric acid, caproic acid, caprylic acid, pelargonic acid, capric acid, lauric acid, myristic acid, palmitic acid, stearic acid, or the unsaturated analogs of these. Branched-chain aliphatic monocarboxylic acids can also be used. Most preferred are benzoic acid, lauric acid, and pelargonic acid.

The dicarboxylic acids useful in the formation of the polyester polyol have the general formula

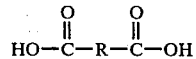

where R is aliphatic or aromatic. Of the aliphatic acids, the most useful are alkylene, vinylene or cycloaliphatic.

Preferred acids when R is alkylene are those in which R has 2–10 carbon atoms. Most preferred of these are succinic acid, glutaric acid, adipic acid, and pimelic acid. When R is a monounsaturated aliphatic, the most useful acids are those in which R has 2-8 carbon atoms with the preferred acids being maleic and itaconic acids. The aromatic dicarboxylic acids that are preferred are phthalic, iso-phthalic, terephthalic, uvitic, and cumidic acids. When R is cycloaliphatic, preferred are cyclohexane or cyclohexene dicarboxylic acids, although other such dicarboxylic acids could also be used.

Mixtures of these aromatic and aliphatic dicarboxylic acids can also be used. Nevertheless, whether mixtures of each kind of acid are used or whether only one of each kind of acid is used, the molar ratio of aromatic diacid to aliphatic diacid should have a range of about 2:1 to 6:1. A ratio of about 4:1 is preferred. It is to be further understood that the lower alkyl mono- or diesters of these acids and the anhydrides, where applicable, of these acids can also be used in place of the acids themselves with equivalent results. If the above-mentioned esters are used, the alkyl groups preferably have no more than 5 carbon atoms.

The polyester polyol can typically be formed by charging the reactants, a suitable solvent, and optionally a reaction catalyst into a reaction vessel that is usually equipped with a condenser and agitator. As mentioned, however, the monocarboxylic acid is present primarily to prevent molecular weight build-up by decreasing the functionality of the pentaerythritol. Accordingly, instead of reacting all the components of the polyol together, it is possible to first form a prepolymer by reacting the acid and pentaerythritol in the aforementioned molar ratios. This prepolymer is then reacted with the other components of the polyol, the branched-chain glycol and dicarboxylic acids.

Useful solvents for the polyol preparation are, for example, xylene, toluene, other substituted benzenes, naphthalene and substituted naphthalenes. The reaction catalysts can be present in the usual amounts and include, for example, dibutyl tin oxide, dibutyl tin dilaurate, sulfuric acid, or one of the sulfonic acids.

The reaction mixture is heated to its reflux temperature, usually 100°-300° C., and there maintained for a period of 1-8 hours. During this period, the esterification by-products are withdrawn. The reaction product, the polyester polyol, should have a number average molecular weight (determined by gel permeation chromatography based on polystyrene standards) of 150-1000, preferably 250-450. The reactants should be chosen also so that the polyester polyol has a hydroxyl content of 5-9% by weight, preferably about 7-8% by weight.

The film-forming blend of the present invention also contains an epoxy-resin or an epoxy-resin/acid ester, which is the esterification product of the epoxy resin and a monocarboxylic acid. This ester forms 4-35% by weight, preferably 4-15% by weight and most preferably 5-10% by weight, of the film-forming blend.

The epoxy resin is itself the reaction product of epichlorohydrin and bisphenol-A and has the general formula

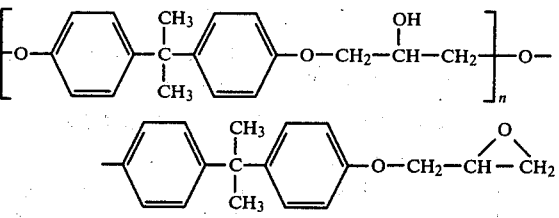

where n is sufficiently large to provide an epoxy resin having an epoxide equivalent weight of 450-2000, preferably 850-1050. The epoxide equivalent weight is the unit weight of epoxy resin that contains one unit equivalent of epoxide.

The ester, which may be used instead of or in a mixture with the epoxy resin, is formed by reacting the above epoxy resin with a monocarboxylic acid. Although the choice of the acid is not critical, most preferred are benzoic acid, para-t-butyl benzoic acid, and the higher fatty acids, those having 8-18 carbon atoms. These fatty acids are often found in their glyceride forms in fats or oils which can be reacted directly with the epoxy resin to give the desired acid ester. Examples are coconut oil, castor oil, cottonseed oil, peanut oil, tung oil, linseed oil, and soya oil.

The esters can be prepared by reacting the acid, or corresponding oils, and epoxy resin together in a closed vessel equipped with agitator, thermocouple, and condenser. The temperature is raised gradually by heat application, with agitation starting as soon as the epoxy resin melts, to about 230°-270° C. over a 1-2 hour period. This temperature is maintained until the resultant ester attains the desired functionality, which can be determined by intermittent sampling to measure the acid number of the ester. At this point, the reaction mixture is cooled and can be thinned with an appropriate organic solvent.

The aminoplast resins are well known as crosslinking or curing agents. Particularly useful are the alkylated products of aminoplast resins, the resins themselves being prepared by the condensation of at least one aldehyde with at least one of urea, N,N-ethyleneurea, dicyandiamide, and aminotriazines such as melamines and guanamines. Among the aldehydes that are suitable are formaldehyde, revertable polymers thereof such as paraformaldehyde, acetaldehyde, crotonaldehyde, and acrolein. Preferred are formaldehyde and revertable polymers thereof. The aminoplast resins can be alkylated with at least one and up to six alkanol molecules containing 1-6 carbon atoms. The alkanols can be straight chain, branched, cyclic, or mixtures of these. Preferred are aminoplast resins that have been alkylated with methanol, butanol, or a mixture of these two. Most preferred are the methylated melamineformaldehyde resins such as hexamethoxymethylmelamine. In the coating composition, the aminoplast resins are 25-35% by weight of the film-forming blend.

The polyester polyol and epoxy-resin or epoxy-resin-/acid ester are normally each in solution after their preparation and are suitable for direct use to form the coating composition of this invention by blending with each other and with the curing agent. The final composition contains 50-90% by weight of the film-forming blend and 10–50% by weight of a solvent for the blend, these percentages being based on the combined weight of the blend and the solvent. One of the useful aspects of the present invention is that it can be conveniently spray-applied even at these high weight-solids levels. The solvent of the final composition can be a mixture of the organic solvents in which the constituents of the film-forming blend are each formed.

The composition of this invention can contain about 0.01–2% by weight, based on the weight of the film-forming blend, of a curing catalyst. Particularly useful are acid catalysts such as organic sulfonic acids, acid phosphates such as methyl and butyl acid phosphate, acid pyrophosphates such as dimethyl acid pyrophosphates, and organic acid sulfate esters. Preferred are the sulfonic acids such as para-toluenesulfonic acid and dinonylnaphthalene disulfonic acid. The sulfonic acids can be neutralized with an amine, preferably a tertiary amine.

The coating composition of the invention can be pigmented, containing an amount of pigment in a pigment/film-former weight ratio of about 0.005/1 to 100/1. Useful pigments are, for example, metallic oxides, such as titanium dioxide or zinc oxide; metal hydroxides; metal flakes; sulfides; sulfates carbonates; carbon black; silica; talc; china clay; and organic dyes.

The pigments can be introduced into the coating composition by first forming a mill base with the polyester polyol. The mill base can be formed, for example, by conventional sand-grinding or ball-milling techniques, and then can be blended, by simple stirring or agitation, with the other constituents of the coating composition.

The coating composition can further optionally contain, as a durability enhancer, an ultraviolet light stabilizer, an antioxidant, or both. The ultraviolet light stabilizer can be present in an amount of 1–20% by weight, based on the weight of the film-forming blend; the antioxidant can be present in an amount of 0.1–5% by weight, based on the weight of the film-forming blend.

Typical ultraviolet light stabilizers are benzophenones, triazoles, triazines, benzotriazoles, benzoates, lower alkyl thiomethylene-containing phenols, substituted benzenes, organophosphorous sulfides, and substituted methylene malonitriles. Particularly useful are the hindered amines and nickel compounds shown in U.S. Pat. No. 4,061,616 Dec. 6, 1977).

Typical antioxidants are tetra-kis alkylene (di-alkyl hydroxy aryl) alkyl ester alkanes, reaction product of p-amino diphenylamine and glycidyl methacrylate, and alkyl hydroxyphenyl groups bonded through carboalkoxy linkages to a nitrogen atom of a heterocyclic nucleus containing an imidodicarbonyl group or an imidodithiocarbonyl group.

One preferred combination of ultraviolet light stabilizer and antioxidant is 2-hydroxy-4-dodecyloxy benzophenone or a substituted 2(2'-hydroxyphenyl) benzotriazole and tetra-kis methylene 3(3',5'-dibutyl-4'hydroxyphenyl) propionate methane.

The coating composition can be applied to a variety of substrates by any of the conventional application methods such as spraying, dipping, brushing, or flow coating. Substrates that can be advantageously coating with the present composition are, for example, metal, steel, wood, glass, or plastics such as polypropylene, polystyrene, copolymers of styrene, and the like. The coating is particularly suited for application over primed or unprimed metal or steel. Typical uses are for coating steel that has been treated with zinc phosphate or iron phosphate, metal substrates precoated with conventional alkyd or epoxy primers, and galvanized steel.

The composition can be cured by heating at 120°–200° C. for 10–30 minutes. A particularly preferred composition cures in 15 minutes at 150° C. or in 30 minutes at 135° C. to a film that is hard, durable, scratch and stain resistant, and chemical resistant. The composition is suitable, for example, for coating automobile or truck bodies, railroad equipment, appliances, and any industrial equipment.

In an additional aspect, it is possible to apply the present coating composition as a two-coat system in which a first, pigmented coat is applied as previously described over the substrate and is then overlaid with a second, unpigmented coat. This can impart to the finish a gloss or appearance that is improved over that attainable when a single coat system is used. This is particularly desirable when the composition is used as an automotive coating. When such a two-coat system is employed, however, the first coat should be allowed to cure to a point where it is tack-free before the second coat is applied. This will normally prevent the solvent in the second coat from attacking the first coat. This attack, or strike-in, can cause the film-formers of the two coats to combine at their interface, negating the improvement in the gloss or appearance.

The following example illustrates the best mode of the invention.

EXAMPLE

The following ingredients are prepared as follows:

| 1. Prepolymer Solution | |
|---|---|
| | Parts by Weight |
| Pentaerythritol | 435.2 |
| Benzoic acid | 780.8 |
| Dibutyltin oxide | 1.2 |
| Xylene | 85.0 |

The reactants are charged into a reaction vessel equipped with an agitator and vapor condenser, and slowly heated to reflux. The mixture is then maintained until the reaction is completed, determined by monitoring the flow of water from the condenser. After the mixture is allowed to cool, it has a solids content of about 91%.

| 2. Polyester Polyol Solution | |
|---|---|
| | Parts by Weight |
| Portion 1 | |
| Neopentyl glycol | 1331.2 |
| Ingredient 1 (91% solids by weight) | 1210.8 |
| Isophthalic acid | 664.0 |
| Phthalic anhydride | 592.0 |
| Adipic acid | 292.0 |
| Dibutyltin oxide | 3.9 |
| Xylene | 75.0 |
| Portion 2 | |
| 2-Ethyl hexanol | 180.0 |
| Amyl acetate | 105.0 |
| Xylene | 80.0 |

Portion 1 is charged into a reaction vessel equipped with an agitator and vapor condenser, and is heated slowly to reflux. The reflux condition is maintained until the reaction is completed, determined by monitoring the flow of the water of esterification from the condenser. Total water collected is approximately 303 parts by weight. The mixture is cooled to 80° C. and portion 2 is added. This mixture is then agitated for 1 hour and then filtered. The resulting reaction product, the polyester polyol, has a hydroxyl content of approximately 7.7% by weight (based on product solids weight) and a number average molecular weight (gel permeation chromatography) of 340. The solution has a Gardner-Holdt viscosity of Z-8 and a solids content of 87% by weight.

3. Mill Base

| | Parts by Weight |
|---|---|
| Polyester polyol solution (ingredient 2) | 108.85 |
| Amyl acetate | 50.0 |
| Pigment dispersant(copolymer of methyl methacrylate/ 2-ethylhexyl acrylate in 62.5/37.5 weight ratio in a toluene/methyl isobutyl ketone/ methyl ethyl ketone solvent, copolymer/solvent weight ratio of 1/1) | 11.0 |
| TiO₂ White pigment | 300.0 |

The constituents are added to a mixing vessel and mixed for 1 hour. The mixture is then charged into a sand mill and ground at a temperature of about 35° C.

A coating composition is then prepared with the following constituents:

| | Parts by Weight |
|---|---|
| Portion 1 | |
| Polyester polyol solution (ingredient 2) | 79.6 |
| Mill Base (ingredient 3) | 647.3 |
| Epoxy-resin/acid ester (45% weight solution of the esterification product of an epichlorohydrin-bisphenol-A epoxy resin, epoxide equivalent weight of 875-1025, and castor oil fatty acids, in a methyl ethyl ketone solvent | 64.3 |
| Dispersant (4.78 parts by weight Cab-O-Sil ®, 40.6 parts polyester polyol solution, 43.3 parts hexamethoxymethylmelamine, 11.32 parts butyl acetate) | 129.6 |
| Portion 2 | |
| Dinonylnaphthalene disulfonic acid (40% by weight in isobutanol) | 10.3 |
| N,N-Dimethyl Ethanolamine | 1.0 |
| Portion 3 | |
| Hexamethoxymethylmelamine | 67.9 |

Portion 1 is charged into a stainless steel vessel and mixed for 15 minutes after which time portion 2 is added, with mixing continuing for an additional 5 minutes. Portion 3 is then mixed into the vessel, giving a coating composition in which the film-forming blend (polyester polyol, epoxy-resin/acid ester, and hexamethoxymethylmelamine) is about 70% of the combined weights of the film-forming blend and solvent. Including pigments, the composition is approximately 83% solids by weight.

The composition is sprayed (DeVillbis air guns using a pressure of 70 pounds per square inch) onto "Bonderite 1000" panels (cold rolled steel with iron phosphate layer) and the panels thus coated are baked for 30 minutes at 135° C. The cured coating has a thickness of about 1.4 mils. When then tested, the coating has a pencil hardness of 5H, a Tukon hardness of 20.3 at 25° C. and of 4.4 at 70° C.

Several of the coated panels are scored to the metal with a nail and placed in a salt-spray cabinet where they are exposed to a mist of a solution of NaCl (5% by weight) in water. After 300 hours, the coating creepage from the score line is 3 mm.

The coatings on such panels are found to be resistant to stains from such common substances as mustard, lipstick, and orange dye and to be immune from attack by common solvents like toluene, xylene, and methyl ethyl ketone.

I claim:

1. A coating composition of a film-forming blend and a solvent for the blend wherein the blend is at least 50% by weight of the combined weight of the blend and the solvent and consists essentially of
   (a) 30–70% by weight, based on the weight of the blend, of a polyester polyol that is the reaction product of
   (1) pentaerythritol and at least one branched-chain glycol selected from the group consisting of neopentyl glycol, pinacol, and mixtures of these, wherein the molar ratio of glycol to pentaerythritol is from 2:1 to 6:1,
   (2) an aromatic or aliphatic monocarboxylic acid, or mixtures thereof, having no more than 18 carbon atoms, wherein the molar ratio of monocarboxylic acid to pentaerythritol is from 1:1 to 2.5:1, and
   (3) a mixture of an aromatic and a aliphatic dicarboxylic acid wherein the molar ratio of aromatic acid to aliphatic acid is from 2:1 to 6:1,
   wherein the polyol has a hydroxyl content of 5–9% by weight;
   (b) 4–35% by weight, based on the weight of the blend, of an epichlorohydrin-bisphenol-A epoxy resin, the esterification product of said resin with a monocarboxylic acid, or mixtures of these; and
   (c) 25–35% by weight, based on the weight of the blend, of an aminoplast resin.

2. The coating composition of claim 1 in which there is 50–70% by weight of (a), 4–15% by weight of (b), and in which (b) is said esterification product.

3. The coating composition of claim 2 wherein the branched-chain glycol is neopentyl glycol and the monocarboxylic acid of said polyester polyol is selected from the group consisting of benzoic acid, lauric acid, pelargonic acid, and mixtures of these.

4. The coating composition of claim 3 wherein the aromatic dicarboxylic acid is selected from the group consisting of phthalic acid, isophthalic acid, terephthalic acid, and mixtures of these, and the aliphatic dicarboxylic acid is selected from the group consisting of succinic acid, glutaric acid, adipic acid, pimelic acid, and mixtures of these.

5. The coating composition of claim 4 wherein the polyester polyol is the reaction product of benzoic acid, pentaerythritol, neopentyl glycol, isophthalic acid, phthalic acid, and adipic acid.

6. The coating composition of claim 5 wherein the monocarboxylic acid of said esterification product is a fatty acid having 8–18 carbon atoms.

7. The coating composition of claim 6 wherein the aminoplast resin is hexamethoxymethylmelamine.

8. The coating composition of claim 1, 2, 3, 4, 5, 6, or 7 additionally containing pigment.

9. The coating composition of claim 1, 2, 3, 4, 5, 6, or 7 additionally containing an ultraviolet light stabilizer, an antioxidant, or both.

10. A substrate coated with a first cured coating composition according to claim 1 overlaid with a second cured coating composition according to claim 1 wherein said first composition contains pigment and said second composition is unpigmented.

11. The substrate of claim 10 wherein said first cured composition additionally contains an ultraviolet light stabilizer.

12. The substrate of claim 11 wherein said first cured composition additionally contains an antioxidant.

13. The substrate of claim 12 wherein said second cured coating composition contains an ultraviolet light stabilizer, an antioxidant, or both.

* * * * *